(12) United States Patent
Kraus et al.

(10) Patent No.: US 11,397,170 B2
(45) Date of Patent: Jul. 26, 2022

(54) REPETITION TIME INTERVAL ADJUSTMENT IN ADAPTIVE RANGE TITRATION SYSTEMS AND METHODS

(71) Applicant: Ecolab USA Inc., St. Paul, MN (US)

(72) Inventors: Paul R. Kraus, Apple Valley, MN (US); Robert J. Ryther, St. Paul, MN (US)

(73) Assignee: Ecolab USA Inc., St. Paul, MN (US)

( * ) Notice: Subject to any disclaimer, the term of this patent is extended or adjusted under 35 U.S.C. 154(b) by 505 days.

(21) Appl. No.: 16/385,588

(22) Filed: Apr. 16, 2019

(65) Prior Publication Data
US 2019/0317063 A1 Oct. 17, 2019

Related U.S. Application Data

(60) Provisional application No. 62/658,219, filed on Apr. 16, 2018.

(51) Int. Cl.
| | | |
|---|---|---|
| G01N 31/16 | (2006.01) | |
| G01N 21/79 | (2006.01) | |
| G01N 35/00 | (2006.01) | |

(52) U.S. Cl.
CPC ....... *G01N 31/16* (2013.01); *G01N 35/00722* (2013.01)

(58) Field of Classification Search
CPC ............................ G01N 31/166; G01N 21/79
USPC ...................... 422/75; 436/51, 163
See application file for complete search history.

(56) References Cited

U.S. PATENT DOCUMENTS

| | | | |
|---|---|---|---|
| 2,977,199 A | | 3/1961 | Quittner |
| 3,026,182 A | | 3/1962 | Jankowski et al. |
| 3,186,799 A | | 6/1965 | Hach |
| 3,189,533 A | | 6/1965 | Anscherlik |
| 3,192,017 A | | 6/1965 | Kruger |
| 3,259,465 A | | 7/1966 | Sheen |
| 3,447,906 A | | 6/1969 | Zimmerli |
| 3,723,062 A | * | 3/1973 | Dahms ................ G01N 31/221 436/51 |
| 3,899,294 A | * | 8/1975 | Magiros ................ G05D 21/02 210/743 |

(Continued)

FOREIGN PATENT DOCUMENTS

| | | | |
|---|---|---|---|
| DE | 19903860 | * | 8/2000 |
| DE | 19950879 | * | 1/2002 |

(Continued)

OTHER PUBLICATIONS

Fleet, B. et al, Analytical Chemistry 1974, 46, 9-11.*

(Continued)

*Primary Examiner* — Arlen Soderquist
(74) *Attorney, Agent, or Firm* — Stinson LLP

(57) ABSTRACT

Systems for quantifying a target analyte concentration in a process solution are provided and can be used, for example, in methods for quantifying a target analyte concentration. These systems and methods include continuous automated titration methods that use titration chemistries to measure the target analyte concentration in the process solution. The method steps provide for efficient and robust automated titration methods for a variety of target analytes and can include methods that provide for methods that provide a dynamic range for measurement of target analyte concentrations.

19 Claims, 3 Drawing Sheets

(56) References Cited

U.S. PATENT DOCUMENTS

| | | | |
|---|---|---|---|
| 3,929,411 A * | 12/1975 | Takano | G01N 35/1097 436/180 |
| 4,018,565 A | 4/1977 | Fletcher, III et al. | |
| 4,120,657 A * | 10/1978 | Nagy | G01N 31/166 204/405 |
| 4,165,218 A * | 8/1979 | Vanhumbeeck | C25D 21/14 436/51 |
| 4,283,201 A * | 8/1981 | DeFord | G01N 31/166 422/62 |
| 4,286,965 A * | 9/1981 | Vanhumbeeck | C23C 18/405 118/689 |
| 4,749,552 A * | 6/1988 | Sakisako | G01N 31/16 422/62 |
| 4,774,101 A * | 9/1988 | Harris | C23C 18/1617 427/345 |
| 4,784,687 A * | 11/1988 | Anderson | C22B 3/165 423/53 |
| 4,920,056 A * | 4/1990 | Dasgupta | G01N 35/08 422/130 |
| 5,004,696 A * | 4/1991 | Clinkenbeard | G01N 31/16 436/51 |
| 5,049,280 A | 9/1991 | Raymond et al. | |
| 5,080,866 A * | 1/1992 | Petty | G01N 31/166 422/110 |
| 5,104,527 A | 4/1992 | Clinkenbeard | |
| 5,132,916 A * | 7/1992 | Gulaian | G01N 31/166 700/267 |
| 5,181,082 A | 1/1993 | Jeannotte et al. | |
| 5,186,895 A * | 2/1993 | Onofusa | G01N 1/28 204/405 |
| 5,192,509 A | 3/1993 | Surjaatmadja et al. | |
| 5,192,984 A * | 3/1993 | Beecher | G01N 1/44 250/576 |
| 5,389,546 A | 2/1995 | Becket | |
| H1479 H * | 9/1995 | Paulonis | C23C 18/1617 422/82.01 |
| 5,484,626 A * | 1/1996 | Storjohann | C23C 18/1617 118/26 |
| 5,721,143 A * | 2/1998 | Smith | G01N 31/162 422/75 |
| 5,855,791 A * | 1/1999 | Hays | C02F 1/008 210/696 |
| 5,924,794 A | 7/1999 | O'Dougherty et al. | |
| 6,010,664 A | 1/2000 | Johnson et al. | |
| 6,268,218 B1 | 7/2001 | Pantoliano et al. | |
| 6,432,661 B1 | 8/2002 | Heitfeld et al. | |
| 6,913,930 B2 * | 7/2005 | Bevan | G01N 21/79 205/775 |
| 7,153,695 B2 | 12/2006 | Roeraade et al. | |
| 7,214,537 B2 * | 5/2007 | Stevens | G05D 11/138 422/62 |
| 7,349,760 B2 | 3/2008 | Wei et al. | |
| 8,071,390 B2 | 12/2011 | Tokhtuev et al. | |
| 8,076,154 B2 | 12/2011 | Erickson et al. | |
| 8,076,155 B2 | 12/2011 | Tokhtuev et al. | |
| 8,119,412 B2 | 2/2012 | Kraus | |
| 8,143,070 B2 | 3/2012 | Fokhtuev et al. | |
| 8,178,352 B2 | 5/2012 | Fokhtuev et al. | |
| 8,236,573 B2 | 8/2012 | Fokhtuev et al. | |
| 8,748,191 B2 | 6/2014 | Kraus et al. | |
| 8,980,636 B2 | 3/2015 | Bolduc et al. | |
| 9,766,183 B2 | 9/2017 | Kraus et al. | |
| 10,150,680 B1 | 12/2018 | Kurani et al. | |
| 10,379,091 B2 * | 8/2019 | Kraus | G06F 17/11 |
| 2002/0151080 A1 | 10/2002 | Dasgupta et al. | |
| 2003/0032195 A1 | 2/2003 | Roeraade et al. | |
| 2003/0121799 A1 * | 7/2003 | Stevens | G05D 21/02 205/775 |
| 2003/0129254 A1 | 7/2003 | Yasuhara et al. | |
| 2003/0175983 A1 * | 9/2003 | Wei | G01N 31/162 436/163 |
| 2004/0023405 A1 * | 2/2004 | Bevan | G01N 31/166 436/163 |
| 2004/0048329 A1 * | 3/2004 | Beuermann | G01N 21/75 435/28 |
| 2004/0065547 A1 * | 4/2004 | Stevens | H01L 21/67253 204/405 |
| 2005/0013740 A1 * | 1/2005 | Mason | G01N 21/79 422/68.1 |
| 2005/0221514 A1 * | 10/2005 | Pasadyn | G05B 13/048 438/14 |
| 2006/0172427 A1 * | 8/2006 | Germouni | C25D 21/14 436/55 |
| 2006/0210961 A1 | 9/2006 | Magnaldo et al. | |
| 2007/0138401 A1 * | 6/2007 | Tokhtuev | G01J 3/36 250/373 |
| 2007/0231910 A1 * | 10/2007 | DeGrandpre | G01N 31/22 436/56 |
| 2008/0305553 A1 * | 12/2008 | Kraus | G01N 21/78 436/135 |
| 2009/0145202 A1 * | 6/2009 | Tokhtuev | G01N 31/228 73/61.48 |
| 2009/0150086 A1 * | 6/2009 | Tokhtuev | G01N 21/05 702/23 |
| 2009/0188401 A1 * | 7/2009 | Anweiler | B01J 47/14 210/96.1 |
| 2010/0136705 A1 | 6/2010 | Kojima et al. | |
| 2010/0237018 A1 * | 9/2010 | Hollebone | G01N 33/1826 210/662 |
| 2011/0045599 A1 * | 2/2011 | Erickson | F04B 13/02 436/110 |
| 2012/0000488 A1 * | 1/2012 | Herdt | C02F 1/4674 134/18 |
| 2012/0028364 A1 | 2/2012 | Kraus et al. | |
| 2012/0103076 A1 * | 5/2012 | Schwarz | G01N 31/16 73/61.59 |
| 2012/0140227 A1 * | 6/2012 | Willuweit | G01J 3/0272 356/413 |
| 2012/0149121 A1 * | 6/2012 | Tokhtuev | G01N 21/05 436/129 |
| 2012/0172437 A1 * | 7/2012 | Kraus | A01N 37/16 514/557 |
| 2012/0273351 A1 * | 11/2012 | Kraus | G05B 13/00 204/407 |
| 2013/0048535 A1 * | 2/2013 | Wang | C10G 75/02 208/47 |
| 2013/0264059 A1 * | 10/2013 | Keasler | A01N 37/16 166/305.1 |
| 2013/0264293 A1 * | 10/2013 | Keasler | A01N 25/32 210/752 |
| 2014/0141523 A1 * | 5/2014 | Tokhtuev | G01N 31/228 436/129 |
| 2014/0273244 A1 | 9/2014 | Bolduc et al. | |
| 2016/0077014 A1 * | 3/2016 | Kraus | G01N 31/166 436/163 |
| 2016/0282820 A1 * | 9/2016 | Perez | G05B 13/047 |
| 2017/0234842 A1 | 8/2017 | Reed | |
| 2017/0276630 A1 * | 9/2017 | Vu | G01N 27/302 |
| 2019/0033273 A1 * | 1/2019 | Kraus | G01N 31/166 |
| 2019/0086375 A1 * | 3/2019 | Ryther | G01N 31/166 |
| 2019/0310235 A1 * | 10/2019 | Kraus | G01N 21/79 |
| 2019/0317063 A1 | 10/2019 | Kraus et al. | |

FOREIGN PATENT DOCUMENTS

| | | |
|---|---|---|
| EP | 159243 * | 10/1985 |
| JP | 64-23161 * | 1/1989 |
| JP | H06-58882 A | 3/1994 |
| JP | 2002-131304 * | 9/2002 |

OTHER PUBLICATIONS

Thomas, S. M. et al, Analytical Biochemistry 1989, 176, 353-359.*
Arnold, D. P. et al, Analytical Chemistry 1989, 61, 2109-2116.*
Marcos, J. et al, Analytical Chemistry 1990, 62, 2237-2241.*
Liang, Y. Y., Analytical Chemistry 1990, 62, 2504-2506.*
Marcos, J. et al, Analytics Chimica Acta 1992, 261, 489-494.*
Marcos, J. et al, Analytica Chimica Acta 1992, 261, 495-503.*
Marcos, J. et al, Analyst 1992, 117, 1629-1633.*

(56) References Cited

OTHER PUBLICATIONS

Sanz-Martinez, A. et al., Analyst 1992, 117, 1761-1765.*
Fuhrmann, B. et al, Analytica Chimica Acta 1993, 282, 397-406.*
Fuhrmann, B. et al, Journal of Automatic Chemistry 1993, 15, 209-216.*
Yarnitzky, C. N. et al, Taianta 1993, 40, 1937-1941.*
Yarnitzky, C. N. et al, Instrumentation Science & Technology 1995, 23, 91-102.*
Garcia, I. L. et al, Analytica Chimica Acta 1995, 308, 67-76.*
Korn, M. et al, Analytica Chimica Acta 1995, 313, 177-184.*
Albertus, F. et al, Analyst 1999, 124, 1373-1381.*
Honorato, R. S. et al, Analytica Chimica Acta 1999, 396, 91-97.*
Tan, A. et al, Laboratory Robotics and Automation 2000, 12, 108-113.*
Paim, A. P. S. et al, Analytical Sciences 2000, 16, 487-491.*
Tanaka, H et al, Analytical Chemistry 2000, 72, 4713-4720.*
Bendikov, T. A. et al, Instrumentation Science & Technology 2002, 30, 371-386.*
Lima, J. L. F. C. et al, Taianta 2004, 64, 1091-1098.*
Pettas, I. A. et al., Analytica Chimica Acta 2004, 522, 275-280.*
Lavorante, A. F. et al, Spectroscopy Letters 2006, 39, 631-650.*
Fossum, T. K. et al, Encyclopedia of Analytical Chemistry 2006, 1-15.*
Santos, J. L. M. et al., Analytica Chimica Acta 2007, 600, 21-28.*
Borges, S. S. et al, Journal of Automated Methods and Management in Chemistry 2007, paper 46219, 6 pages.*
Zagatto, E. A. G. et al, Journal of Analytical Chemistry, 2009, 64, 524-532.*
Crispino, C. C. et al, Analytical Methods 2014, 6, 302-307.*
Sasaki, M. K. et al, Analytica Chimica Acta 2016, 902, 123-128.*
Sully, B. D., et al., "The Analysis of Solutions of Per-Acids and Hydrogen Peroxide," Analyst, Aug. 1962, pp. 553-657, vol. 87.
Almeida, C. M. N. V., et al., "An Automatic Titrator Based on a Multicommutated Unsegmented Flow System Its Application to Acid-Base Titrations," Analytica Chimica Acta, 2000, pp. 213-223, vol. 407, No. 1.
Hetherington, M. A., et al., "A Novel PC-Based Gravimetric Autotitrator With A Multi-Solution Delivery System," Canadian Journal of Chemistry, 1995, pp. 1374-1379, vol. 73, No. 8.
Wojtowicz, M., et al., "Novel Approaches to Analysis by Flow Injection Gradient Titration," Analytica Chimica Acta, 2007, pp. 78-83, vol. 600, No. 1.
Salgado, et al., Spectrophotometric Determination of the pKa, Isosbestic Point and Equation of Absorbance vs. pH for a Universal pH Indicator, American Journal of Analytical Chemistry, 2014, 5, pp. 1290-1301.
Blaedel W.J. et al., Continuous Automated, Buretless Titrator with Direct Readout, Analytical Chemistry, vol. 36, No. 8 (Jul. 1964) pp. 1617-1623.
Katsumata, Hideyuki et al., Potentiometric flow titration of iron(II) and chromium(VI) based on flow rate ratio of a titrant to a sample, Talanta 48 (1999) pp. 135-141.

* cited by examiner

REPETITION TIME INTERVAL ADJUSTMENT IN ADAPTIVE RANGE TITRATION SYSTEMS AND METHODS

CROSS REFERENCE TO RELATED APPLICATIONS

This application claims priority to U.S. Provisional Patent Application Ser. No. 62/658,219 filed on Apr. 16, 2018, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

FIELD OF THE INVENTION

Titration systems and methods can be used for a variety of analyses, including for controlling the concentration of an agent in a chemical process. Particularly, systems and methods for controlling an automated titration system including controlling a controller that initiates a series of titration processes repeated one after the other with a set time interval between titration processes and analyzing sample variation by determining the difference between the current analyte concentration and the previous analyte concentration from a previous titration process, and comparing the difference between the current analyte concentration. The difference between previous analyte concentration from the previous titration and the current analyte concentration is compared to a specified minimum analyte concentration variation range. These systems and methods can provide an adaptive range for measurement of target analyte concentrations.

BACKGROUND OF THE INVENTION

Titration is a method well known and practiced to determine concentrations of components of a solution. Titrations of various chemistries are practiced, wherein generally a titrant is added to a solution in which it reacts with select components thereof. Once the entirety of the reacting component has reacted with the known titrant, a measurable or noticeable change occurs, indicating the reaction is complete.

While known as a science, titrations can be a tedious process, requiring careful practice by a chemist or other skilled operator. In some instances, it can be impractical to keep a chemist or other technician on hand to perform titrations, though data acquired by titrations can be desirable. Automated titrators can be implemented which attempt to judge when complete reactions have occurred and the appropriate titration calculations to determine an amount of a component in a solution. However, depending on the reaction, it can be difficult for an automated process to accurately determine an endpoint of a reaction. Additionally, automated systems can require a large amount of time to complete a process, which can be undesirable or unacceptable if a solution needs monitoring at certain time intervals.

Titration results can be used to control various chemical processes including controlling the concentration of an agent in a chemical process. When used in this manner, the titration process can consume time and titration regents inefficiently.

A need exists for more efficient automated titration methods and systems that provide efficient analysis in terms of time and in terms of use of reagents, particularly for controlling chemical processes. Thus, methods providing an adaptive range of measurement by comparing the titration endpoint for a series of titrations can be used that allow for the time interval between titration measurements to be changed depending on the difference in the analyte concentration from one measurement to the next measurement.

SUMMARY OF THE INVENTION

Methods for controlling a chemical process are disclosed herein and can comprise controlling a process controller communicatively coupled to a chemical reagent pump injecting a chemical reagent into the chemical process through a chemical reagent injection pump; and controlling a sample controller communicatively coupled to a sample pump, a titrant pump, and a detector. The controller can initiate a series of titration processes repeated one after the other with a set time interval between titration processes. Each titration process can comprise collecting a sample from the chemical process; controlling the sample pump to set the flow rate of the sample as a continuously flowing and refreshed sample stream in a reaction manifold, controlling the titrant pump for pumping the titrant into the reaction manifold to contact the continuously flowing and refreshed sample stream and successively altering a titrant concentration in the reaction manifold and receiving a response from the detector for each different titrant concentration, and identifying a titration endpoint for the reaction between the analyte and the titrant and determining an analyte concentration in the sample stream. The method also comprises analyzing sample variation by determining the difference between a current analyte concentration and a previous analyte concentration from a previous titration process, and comparing the difference between the current analyte concentration and the previous analyte concentration from the previous titration to a specified minimum analyte concentration variation range. When the difference between the analyte concentration and the analyte concentration from the previous titration is greater than the specified minimum analyte concentration variation range, the controller reduces the set time interval between titration processes.

Systems and methods of controlling an automated titration system including controlling a controller communicatively coupled to a sample pump, a titrant pump, and a detector, the controller initiating a series of titration processes repeated one after the other with a set time interval between titration processes; each titration process comprising controlling the sample pump to set the flow rate of a continuously flowing and refreshed sample stream in a reaction manifold, controlling the titrant pump for pumping the titrant into the reaction manifold to contact the continuously flowing and refreshed sample stream and successively altering a titrant concentration in the reaction manifold and receiving a response from the detector for each different titrant concentration, and identifying a titration endpoint for the reaction between the analyte and the titrant and determining an analyte concentration in the sample stream; analyzing sample variation by determining the difference between a current analyte concentration and a previous analyte concentration from a previous titration process, and comparing the difference between the current analyte concentration and the previous analyte concentration from the previous titration to a specified minimum analyte concentration variation range, when the difference between the analyte concentration and the analyte concentration from the previous titration is greater than the specified minimum analyte concentration variation range, the controller reduces the set time interval between titration processes.

The methods described herein can further comprise storing the specified minimum analyte concentration variation range and the analyte concentration from two or more of the series of titration processes in a memory device.

Additionally, the methods described herein can further comprise controlling the process controller communicatively coupled to the memory device and the chemical reagent injection pump.

Further, when the difference between the analyte concentration and the analyte concentration from the previous titration is greater than the specified minimum analyte concentration variation range, then the process controller increases or decreases an injection rate of the chemical reagent injection pump.

Also, when the difference between the analyte concentration and the analyte concentration from the previous titration is greater than the specified minimum analyte concentration variation range and the analyte concentration is greater than the analyte concentration from the previous titration, the injection rate of the chemical reagent injection pump is decreased.

Additionally, when the difference between the analyte concentration and the analyte concentration from the previous titration is greater than the specified minimum analyte concentration variation range and the analyte concentration is less than the analyte concentration from the previous titration, the injection rate of the chemical reagent injection pump is increased.

Further, when the difference between the analyte concentration and the analyte concentration from the previous titration is not greater than the specified minimum analyte concentration variation range, then the process controller does not change an injection rate of the chemical reagent injection pump.

The methods described herein, wherein the titrant concentration is altered by changing the flow rate of the titrant.

The methods described herein, wherein the set time interval between titration processes is from about 10 seconds to about 2 hours.

The methods described herein, wherein the set time interval between titration processes is from about 5 minutes to about 1 hour.

The methods described herein, wherein the set time interval between titration processes is reduced by a factor of from about 1.5 to about 10.

The methods described herein, wherein the set time interval between titration processes is reduced by a factor of from about 1.5 to about 4.

The methods described herein, wherein the specified minimum analyte concentration variation range is ±2.5% to about ±25% of the analyte concentration measured.

The methods described herein, wherein the specified minimum analyte concentration variation range is from about 1 ppm to about 4000 ppm when the analyte is peracid.

Additionally, the methods described herein can further comprise when the difference between the analyte concentration and the analyte concentration from the previous titration is less than or equal to the specified minimum analyte concentration variation range, the controller increases the set time interval between titration processes.

The methods described herein can have the set time interval between titration processes is increased by a factor from about 1.5 to about 10.

The methods described herein can have the set time interval between titration processes is increased to an original value.

The methods described herein can have the chemical process be a hydraulic fracturing process, a meat processing process, or a vegetable processing process.

The methods described herein, wherein the chemical reagent is a biocide, an acid, a base, a hardness reagent, a detergent, or a combination thereof.

DETAILED DESCRIPTION

Figure 1:
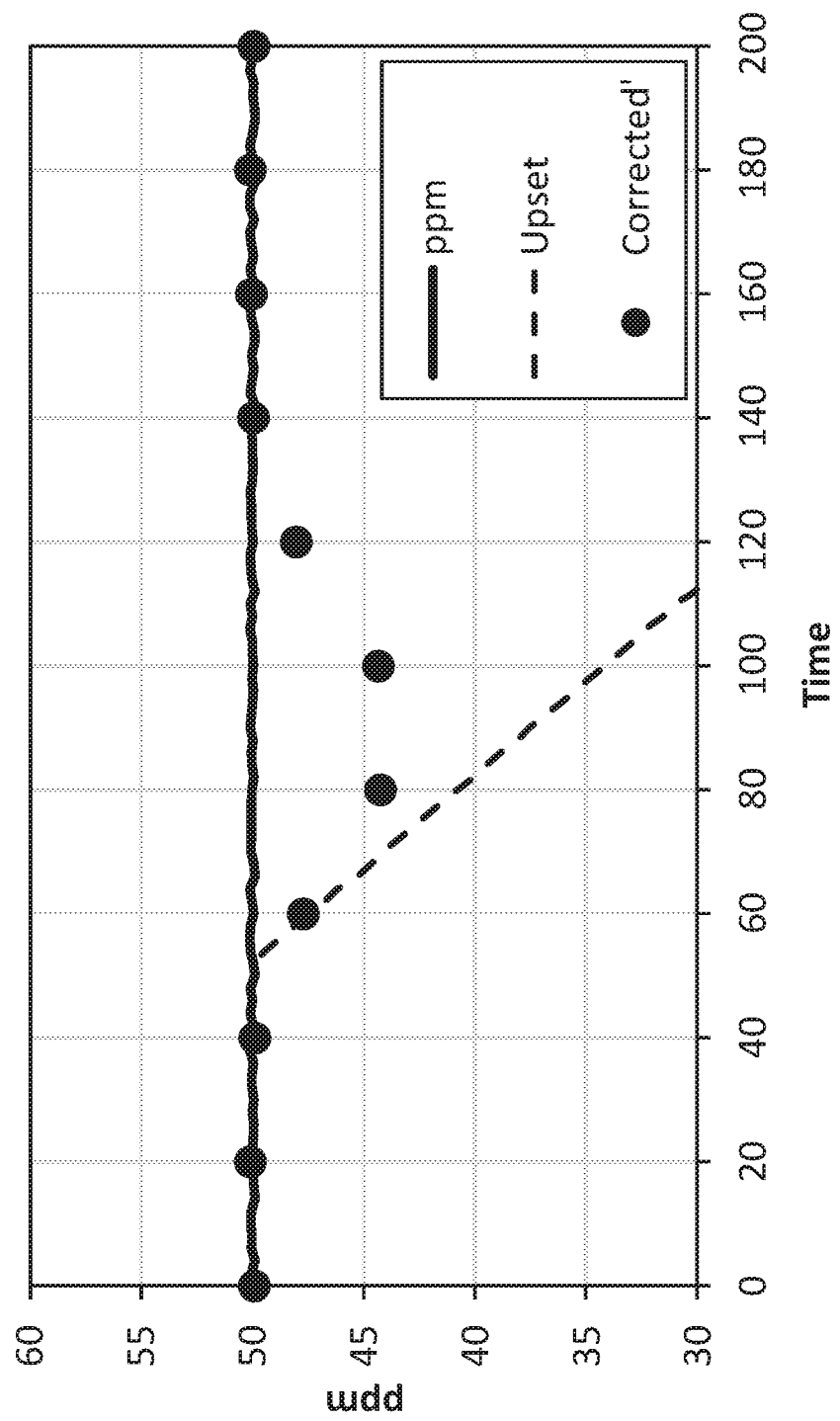
FIG. 1 is a graph of the time versus the analyte concentration in ppm showing a process upset and a return to steady state for a system having the same analysis time interval.

The automatic titration systems and methods of use for controlling a chemical process described herein have been developed to decrease the time interval between titration analyses when a process upset occurs and provide feedback to the process controller to change the injection rate of the chemical reagent until the process is back under control. Once the process is under control and the results of successive measurements is within an acceptable variation range, the time interval between successive measurements is increased. The advantages of these methods are providing a quicker and more efficient return of the process from upset to control states and also to provide a more efficient use of reagents since less reagent is used when the process is in control.

Systems and methods of controlling an automated titration system including controlling a controller communicatively coupled to a sample pump, a titrant pump, and a detector, the controller initiating a series of titration processes repeated one after the other with a set time interval between titration processes; each titration process comprising controlling the sample pump to set the flow rate of a continuously flowing and refreshed sample stream in a reaction manifold, controlling the titrant pump for pumping the titrant into the reaction manifold to contact the continuously flowing and refreshed sample stream and successively altering a titrant concentration in the reaction manifold and receiving a response from the detector for each different titrant concentration, and identifying a titration endpoint for the reaction between the analyte and the titrant and determining an analyte concentration in the sample stream; analyzing sample variation by determining the difference between a current analyte concentration and a previous analyte concentration from a previous titration process, and comparing the difference between the current analyte concentration and the previous analyte concentration from the previous titration to a specified minimum analyte concentration variation range, when the difference between the analyte concentration and the analyte concentration from the previous titration is greater than the specified minimum analyte concentration variation range, the controller reduces the set time interval between titration processes.

The method can further comprise storing the specified minimum analyte concentration variation range and the analyte concentration from two or more of the series of titration processes in a memory device.

Also, the method can further comprise controlling the process controller communicatively coupled to the memory device and the chemical reagent injection pump.

In the methods described herein, when the difference between the analyte concentration and the analyte concentration from the previous titration is greater than the specified minimum analyte concentration variation range, the process controller can increase or decrease an injection rate of the chemical reagent injection pump.

Further, in these methods, when the difference between the analyte concentration and the analyte concentration from the previous titration is greater than the specified minimum analyte concentration variation range and the analyte concentration is greater than the analyte concentration from the previous titration, the injection rate of the chemical reagent injection pump can be decreased.

Additionally, for these methods, when the difference between the analyte concentration and the analyte concentration from the previous titration is greater than the specified minimum analyte concentration variation range and the analyte concentration is less than the analyte concentration from the previous titration, the injection rate of the chemical reagent injection pump can be increased.

For methods described herein, when the difference between the analyte concentration and the analyte concentration from the previous titration is not greater than the specified minimum analyte concentration variation range, then the process controller does not change an injection rate of the chemical reagent injection pump.

The titrant concentration can be altered by changing the flow rate of the titrant.

The set time interval between titration processes can be from about 10 seconds to about 2 hours, from about 10 seconds to about 1.8 hours, from about 10 seconds to about 1.6 hours, from about 10 seconds to about 1.5 hours, from about 10 seconds to about 1.4 hours, from about 10 seconds to about 1.2 hours, from about 10 seconds to about 1 hour, from about 2 minutes to about 2 hours, from about 2 minutes to about 1.8 hours, from about 2 minutes to about 1.6 hours, from about 2 minutes to about 1.4 hours, from about 2 minutes to about 1.2 hours, from about 2 minutes to about 1 hour, from about 5 minutes to about 2 hours, from about 5 minutes to about 1.8 hours, from about 5 minutes to about 1.6 hours, from about 5 minutes to about 1.4 hours, from about 5 minutes to about 1.2 hours, or from about 5 minutes to about 1 hour.

The set time interval between titration processes can be reduced by a factor of from about 1.5 to about 10, from about 1.5 to about 9, from about 1.5 to about 8, from about 1.5 to about 7, from about 1.5 to about 6, from about 1.5 to about 5, or from about 1.5 to about 4.

The specified minimum analyte concentration variation range is from about ±2.5% to about ±25% of the analyte concentration measured. For example, if the analyte concentration is about 50 ppm, the analyte concentration variation range is from about 1.25 ppm to about 12.5 ppm. If the analyte concentration is about 4000 ppm, the analyte concentration variation range is from about 100 ppm, to about 1000 ppm.

The methods described herein, further comprising when the difference between the analyte concentration and the analyte concentration from the previous titration is less than or equal to the specified minimum analyte concentration variation range, the controller increases the set time interval between titration processes.

The methods described herein, wherein the set time interval between titration processes is increased by a factor from about 1.5 to about 10, from about 1.5 to about 9, from about 1.5 to about 8, from about 1.5 to about 7, from about 1.5 to about 6, from about 1.5 to about 5, or from about 1.5 to about 4.

The methods described herein, wherein when the difference between the analyte concentration and the analyte concentration from the previous titration is less than or equal to the specified minimum analyte concentration variation range, the set time interval between titration processes is increased to an original value.

An example of a system that can be controlled using the systems and methods described herein is a hydraulic fracturing process wherein the analyte is an agent contained in a fracturing fluid. The agent can be a biocide, an acid, a base, a hardness reagent, a detergent, or a combination thereof. The agent can be detected during the fracturing process and if the concentration of the agent is either too low or too high the controller can add more or less of the agent to the process by increasing or decreasing the concentration of the agent in the fracturing fluid. As the hydraulic fracturing process proceeds, the method would measure the concentration of the agent at a set time interval and if the concentration of the agent changes more than a threshold value, then the method would control the agent pump to increase or decrease the amount of the agent added to the process and the set time interval would be decreased until the concentration of the agent returns to a steady state.

In a continuous mode of operation, a sample flows continuously and is analyzed without isolating any discrete portion of the sample. Instead, the sample flow rate is determined and/or controlled to be a known value that can be fixed or variable.

The reaction manifold of the automated titration system can comprise a liquid mixer downstream from the titrant inlet and upstream from the detector.

The liquid mixer can independently be a static mixer, coiled reactor, tubular reactor, mixing chamber, gradient chamber, or a combination thereof.

The automated titration system can further comprise a conditioning manifold upstream from the titrant inlet and downstream from the sample stream inlet.

The conditioning manifold of the automated titration system can comprise a liquid mixer.

The conditioning manifold of the automated titration system, can further comprise a mixing loop.

The sample pump of the automated titration system can be a variable speed pump having a maximum flow rate and a minimum flow rate, and the controller can control the sample pump to adjust the flow rate of the continuously flowing and refreshed sample stream to the minimum flow rate and to the maximum flow rate of the sample pump.

Alternatively, the sample pump of the automated titration system can have a fixed flow rate for the continuously flowing and refreshed sample stream.

The titrant pump of the automated titration system can be a variable speed titrant pump having a maximum flow rate and a minimum flow rate, and the controller can control the titrant pump to adjust the flow rate of the titrant to the minimum flow rate and to the maximum flow rate of the titrant pump.

Additionally, the automated titration system can include a plurality of conditioning reagent pumps; for example, the system can include from one to five or more conditioning reagent pumps that can provide different conditioning reagents into the continuously flowing and refreshed sample stream.

The detector of the automated titration system can be a light-based detector, an electrochemically-based detector, a biologically-based detector, or a combination thereof.

The detector of the automated titration system can be an oxidation-reduction potential probe, an amperometric probe, an optical sensor, an electrical resistivity probe, or a combination thereof.

The detector of the automated titration system can comprise an optical sensor.

The automated titration system can further comprise a conditioning reagent pump for pumping a conditioning reagent into the conditioning manifold to mix with the continuously flowing and refreshed sample stream.

The conditioning reagent of the automated titration system can be a pH buffer, an acid, a base, a reaction catalyst, a chemical indicator, a sequestrant, a surfactant, a conductivity modifying salt, an ion pair reagent, a biologically based chemical, or a combination thereof.

The conditioning reagent of the automated titration system can comprise potassium iodide, acetic acid, starch indicator, ammonium molybdate, or a combination thereof.

The conditioning reagent pump of the automated titration system can further comprise a first conditioning reagent pump for pumping a first conditioning reagent and a second conditioning reagent pump for pumping a second conditioning reagent.

The first conditioning reagent of the automated titration system can comprise a metal iodide and the second conditioning reagent can comprise an indicator. In addition, a third conditioning reagent can be an acid.

The conditioning reagent pump of the automated titration system injects the conditioning reagent into the flowing sample stream, wherein the controller is communicatively coupled to the conditioning reagent pump and configured to control the conditioning reagent pump to set a flow rate of the conditioning reagent injected into the continuously flowing and refreshed sample stream.

FIG. 1 is a graph of the concentration of an analyte in ppm versus the time of the process. This graph shows a simulation where the monitoring system is configured to measure the sample every 20 time units. As shown in the simulated graph, if the process experiences an upset (or deviation) from the steady state analyte concentration at t=60, then the system controller would respond to this deviation by changing the feed reagents to bring the process back to the steady state concentration. As shown in FIG. 1, this process takes until t=140 to return to the steady state analyte concentration.

Figure 2:
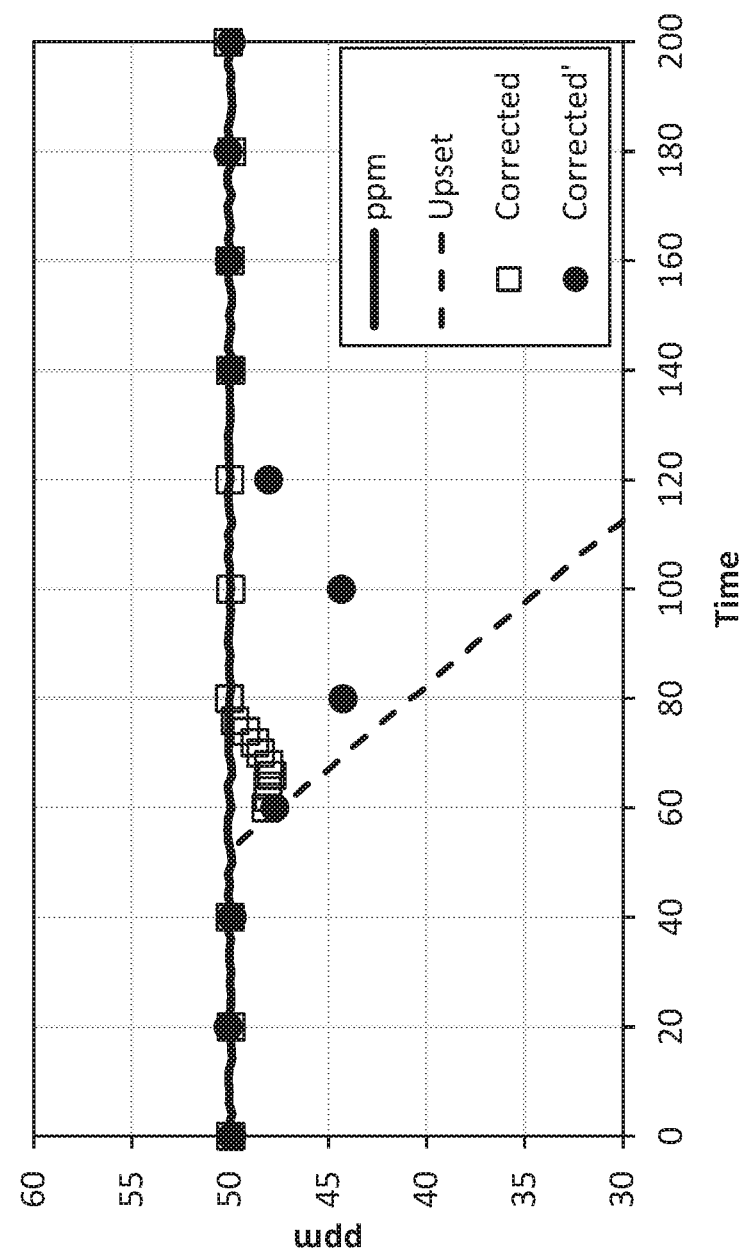
FIG. 2 is a graph of the time versus the analyte concentration in ppm showing a process upset and a return to steady state for a system having an adaptive time interval.

FIG. 2 is a graph of the concentration of an analyte in ppm versus the time of the process and shows a simulation where the monitoring system is configured to increase the measurement frequency when the process experiences an upset (or deviation). For example, by increasing the measurement frequency from 20 to 2 time units the system can be returned to a controlled state by t=80, a significant decrease in the time required to return the system to a steady state.

Figure 3:
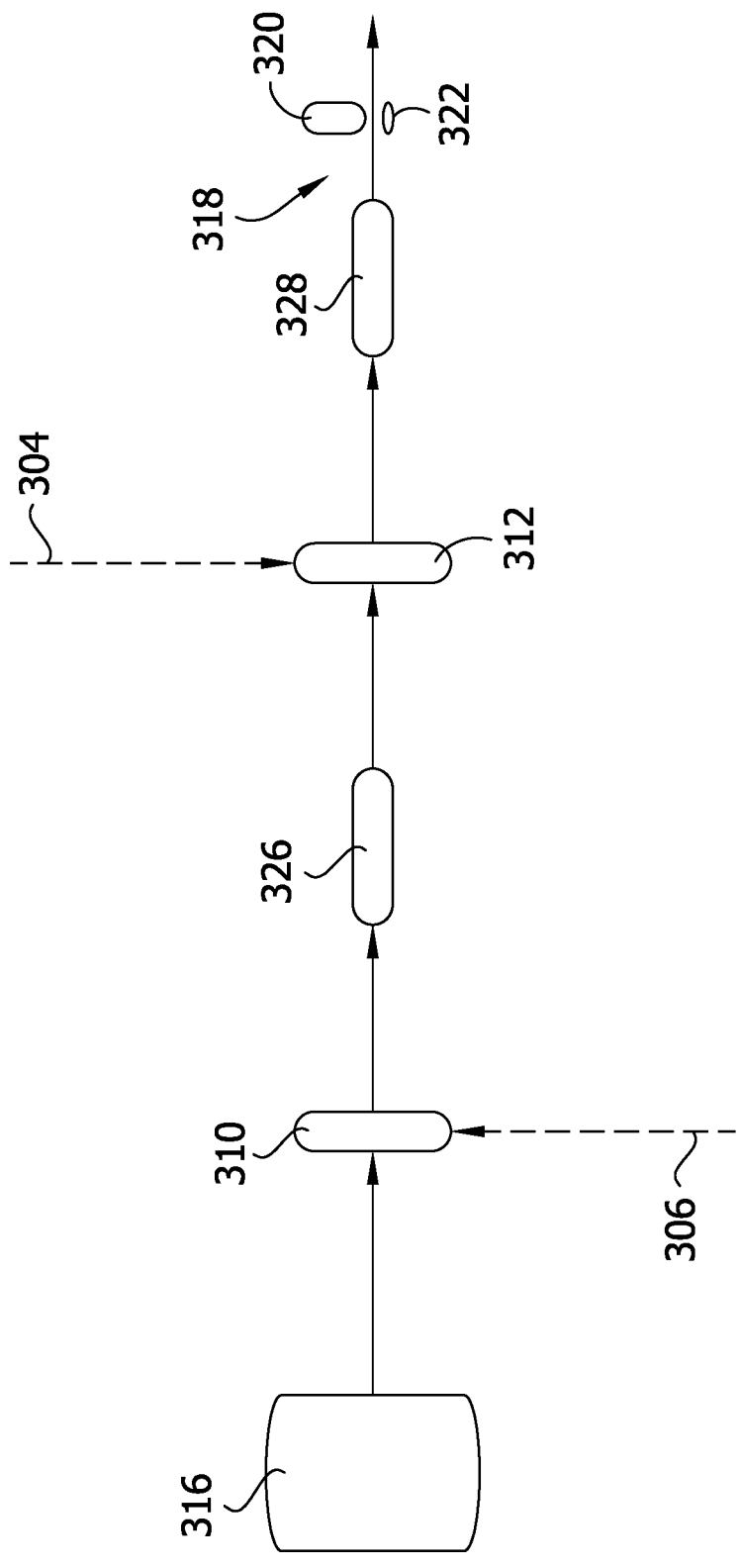
FIG. 3 is a schematic of an automatic titrator system useful for the methods described herein.

FIG. 3 is a schematic diagram of an exemplary continuous-mode automatic titrator that can be used for the methods described herein. The analyzer comprises a first manifold 310, a line from the first manifold 310 to a mixer 326, the mixer 326, a line from the mixer 326 to a second manifold 312, the second manifold 312, a line from the second manifold 312 to a second mixer 328, the second mixer 328, a line from the second mixer 328 to a detector 318, and the detector 318. Here, the collected sample 316 flows through a line at some known rate into a first manifold 310, where it encounters reagents 306 that combine with the sample 316. A wide variety of reagents known for standard titrations can be used, and a sufficient addition of reagents 306 will cause the sample 316 to change. In this continuous-mode operation, however, the determining factor of "sufficient addition of reagents" corresponds to the rate of reagent addition. This is because the sample 316 is flowing through the system continuously so fresh sample 316 is continuously fed into the first manifold 310. Accordingly, if the reagents 306 are added too slowly, they will fail to adequately react with the entire sample 316 and the sample 316 may not change. Put another way, in a given amount of time, a certain volume of sample 316 will flow through a particular point in the system. In order to achieve the desired change, then, there needs to be an appropriate volume of reagent 306 that also flows past this point during the same time, which corresponds to a sufficient flow rate. The sample 316 and reagents 306 can be mixed in a mixer 326.

Thus, an excess flow rate or reagent 306 is used in order to assure that the amount of sample flowing is the limiting factor in the reaction to cause the change. This is analogous to utilizing an excess volume of reagent in batch-mode as has been previously discussed. Once the sample 316 and reagents 306 have combined in the first manifold 310 to form a solution, this solution continues to flow through the system. A wide variety of detectors can be used including detectors that detect a spectrophotometric change, an electrochemical change, or a pH change.

Some systems comprise a detector 318, such as a light source 320 and an optical sensor 322, which senses radiation emitted from the light source 320 after it travels through the solution path. Accordingly, the optical arrangement 318 can determine whether or not the solution has sufficiently changed color before attempting a titration. This can be sensed by a user in a manual operation or can be controlled by a PLC in an automated system. If the solution is sensed as having not achieved the desired change, e.g., turned to the desired color, the flow rate of the reagents can be increased or the flow rate of the sample decreased in order to increase the reagent-to-sample ratio. Alternatively, the lack of a change, e.g., color change, can trigger an alarm to cease operation of the system, possibly indicating that the reservoir of one or more reagents can have run out or that the sample lacks the target analyte expected to be therein.

Once the sample 316 and reagents 306 have mixed, and the resulting solution has been determined to have undergone a change, e.g., color change, titrant 304 can be added, using a second manifold 312, for example. Titrant 304 can be mixed in to the solution by a mixer 328. Similarly to the incorporation of reagents 306, the flow rate of the titrant 304 is analogous to the amount of titrant added to the sample in a batch mode. Again, a wide variety of standard titrants can be used. Therefore, at an appropriate flow rate of titrant 304 into the flowing solution, the titration should reach an endpoint of the reaction of the target analyte with the titrant.

To reach a meaningful endpoint yielding accurate results, the lowest flow rate resulting in viewing the change, e.g., color change, should be used. This is because if the flow rate of the titrant 304 is too high (i.e. above the minimum to achieve the change, e.g., color change, or other detectable endpoint), the characteristic of the endpoint can still be observed. For example, the addition of too much sodium thiosulfate in the batch mode would still result in a transparent sample even though an excess of titrant was used, since the same endpoint could have been achieved at a lesser dose.

The system could include multiple sample pumps and multiple titrant pumps. Also, the system could include more than one flow manifold. Each of these alternative system configurations could be tailored to the specific system, samples, and titrants in order to provide advantageous control of a process.

Accordingly, if the titrant is added too slowly, it will fail to adequately react with the conditioned sample and the conditioned sample may not change. Put another way, in a given amount of time, a certain volume of sample will flow through a particular point in the system. In order to achieve the desired change, then, there needs to be an appropriate volume of titrant that also flows past this point during the same time, which corresponds to a sufficient flow rate.

The process can be automated by a controller such as a programmable logic controller (PLC), using feedback mechanisms from the detector.

The flow rate of the titrant can be changed by an amount that is nonlinear over time. An exponential increase in flow rate, for example, will begin by making small changes in the flow rate while the concentrations involved are small. Over time, as the concentrations become larger (since the flow rate has continued to increase), small changes in flow rate become unnecessarily precise compared to the concentrations at hand and the flow rate can increase by larger amounts.

A use of the system could be in a hydraulic fracturing process. In a hydraulic fracturing process, a hydraulic fracturing fluid comprising a variety of agents can be injected into a hydrocarbon-containing subterranean formation under pressure to increase the permeability of the subterranean formation. The hydraulic fracturing fluid can comprise a biocide to control the concentration of microbes in the produced water of the well. It is advantageous to keep the biocide concentration in the well at a minimal dose and a system described herein can be used to provide a feedback loop that increases the concentration of the biocide when the microbe load of the fracking fluid increases or decreases the concentration of the biocide when the microbe load of the fracturing fluid decreases.

Additionally, similar to the biocide in a hydraulic fracturing process, an intermediate chemical species can be monitored with the methods described herein, in a control, or feedback mode. For example, the process could include a chemical reaction process, a polymerization process, a biological process, and the like wherein an intermediate chemical component can be analyzed and wherein the concentration of that component determines whether the process requires an alteration (e.g., change in concentration of a chemical additive or a physical property like system flow, temperature, or pressure) to adjust the process back to an advantageous state.

A low concentration of peroxide and peracid can be accurately resolved by the small changes in concentrations early in the process, while large concentrations of peracid and/or peroxide can be titrated in a shorter amount of time since the rate of titrant addition increases more rapidly over time.

An advantage of this method is that, with a fast enough optical arrangement, the analysis at each injection point can be done very quickly. Thus, only a small amount of titrant needs to be added at each point to determine whether or not the flow rate is sufficient for complete titration, and an overall small amount of titrant is needed to determine an endpoint. This process can be automated by a device such as a PLC in similar ways as described relating to alternatives, wherein the controller can control the flow rates of the sample and titrants, detect the titration by means of the optical arrangement, and calculate the concentration from the flow rates. In this embodiment, the controller performs the additional task of determining a "cut-off" point, above which titration occurred and below which it did not.

The method for quantification of a target analyte concentration in a sample stream includes continuously flowing and continuously refreshing the sample stream at a variable flow rate through an analyzer comprising a manifold and a detector; quantifying the target analyte concentration by continuously adding a titrant to the analyzer and setting a titrant concentration change by changing the titrant concentration through increasing or decreasing a flow rate of the titrant over a specified range; and detecting a titration endpoint for the reaction between the target analyte and the titrant within a specified target analyte concentration range.

The method described herein that further comprises a second titrant flow stream wherein the titrant concentration in the second titrant flow stream is different from the titrant concentration in the titrant flow stream.

The method described herein can have a variable flow rate of the sample from about 0.1 µL/minute to about 1 mL/minute. The method described herein, can have the variable flow rate of the sample be from about 0.1 µL/minute to about 0.75 mL/minute, from about 0.1 µL/minute to about 0.5 mL/minute, from about 0.1 µL/minute to about 0.25 mL/minute, from about 0.1 µL/minute to about 0.1 mL/minute, from about 0.1 µL/minute to about 75 µL/minute, from about 0.1 µL/minute to about 50 µL/minute, from about 0.1 µL/minute to about 25 µL/minute, from about 0.1 µL/minute to about 10 µL/minute, from about 1 µL/minute to about 1 mL/minute, from about 1 µL/minute to about 0.75 mL/minute, from about 1 µL/minute to about 1 mL/minute, from about 1 µL/minute to about 25 mL/minute, from about 1 µL/minute to about 0.1 mL/minute, from about 1 µL/minute to about 75 µL/minute, from about 1 µL/minute to about 50 µL/minute, from about 1 µL/minute to about 25 µL/minute, from about 1 µL/minute to about 10 µL/minute, from about 5 µL/minute to about 1 m L/minute, from about 5 µL/minute to about 0.75 mL/minute, from about 5 µL/minute to about 1 mL/minute, from about 5 µL/minute to about 25 mL/minute, from about 5 µL/minute to about 0.1 mL/minute, from about 5 µL/minute to about 75 µL/minute, from about 5 µL/minute to about 50 µL/minute, from about 5 µL/minute to about 25 µL/minute, or from about 5 µL/minute to about 10 µL/minute.

The method described herein can have a variable flow rate of the sample be from about 1 mL/minute to about 200 mL/minute.

The method described herein can have a variable flow rate of the sample be from about 1 mL/minute to about 175 mL/minute, from about 1 mL/minute to about 150 mL/minute, from about 1 mL/minute to about 125 mL/minute, from about 1 mL/minute to about 100 mL/minute, from about 1 mL/minute to about 75 mL/minute, from about 1 mL/minute to about 50 mL/minute, from about 1 mL/minute to about 30 mL/minute, from about 2 mL/minute to about 200 mL/minute, from about 2 mL/minute to about 175 mL/minute, from about 2 mL/minute to about 150 mL/minute, from about 2 mL/minute to about 125 mL/minute, from about 2 mL/minute to about 100 mL/minute, from about 2 mL/minute to about 75 mL/minute, from about 2 mL/minute to about 50 mL/minute, from about 2 mL/minute to about 30 mL/minute, from about 5 mL/minute to about 200 mL/minute, from about 5 mL/minute to about 175 mL/minute, from about 5 mL/minute to about 150 mL/minute, from about 5 mL/minute to about 125 mL/minute, from about 5 mL/minute to about 100 mL/minute, from about 5 mL/minute to about 75 mL/minute, from about 5 mL/minute to about 50 mL/minute, preferably, from about 5 mL/minute to about 30 mL/minute.

The method described herein can have a variable flow rate of the sample from about 200 mL/minute to about 100 L/minute. The method described herein can have a variable flow rate of the sample be from about 200 mL/minute to about 75 L/minute, from about 200 mL/minute to about 50 L/minute, from about 200 mL/minute to about 25 L/minute, from about 200 mL/minute to about 10 L/minute, from about 200 mL/minute to about 5 L/minute, from about 200 mL/minute to about 2 L/minute, from about 200 mL/minute to about 1 L/minute, from about 500 mL/minute to about 100 L/minute, from about 500 mL/minute to about 75 L/minute, from about 500 mL/minute to about 50 L/minute, from about 500 mL/minute to about 25 L/minute, from about 500 mL/minute to about 10 L/minute, from about 500 mL/minute to about 5 L/minute, from about 500 mL/minute to about 2 L/minute, from about 500 mL/minute to about 2 L/minute, from about 1 L/minute to about 100 L/minute, from about 1 L/minute to about 75 L/minute, from about 1 L/minute to about 50 L/minute, from about 1 L/minute to about 25 L/minute, from about 1 L/minute to about 10 L/minute, from about 1 L/minute to about 8 L/minute, or from about 1 L/minute to about 5 L/minute.

The method described herein can have the detection range of the analyte concentration be a larger range at a lower sample flow rate and a smaller range at a higher sample flow rate.

The method described herein that further comprises continuously adding a conditioning reagent to the sample stream in a concentration proportional to the target analyte concentration.

The method described herein that further comprises detecting the titration endpoint using a detector that is a defined distance from a point of titrant addition and calculating the titrant concentration using the distance between the detector and the point of titrant addition, the flow rate of the titrant, and the system volume.

The method described herein that further comprises varying the titrant concentration by controlling its flow rate wherein the detector signal from the reaction product of the titration is correlated in time with the titrant concentration.

The method described herein that further comprises dosing a calibrant of known concentration into the sample stream, detecting the calibrant concentration, and calculating the response.

The method described herein that further comprises varying the titrant concentration using a mathematical function and identifying the titration endpoint within the specific target analyte concentration range.

The method described herein can have the mathematical function be a linear function, a step-wise function, a sine function, a square wave function, an exponential function, or a combination thereof.

The method described herein that further comprises controlling the titrant concentration using a feedback loop that responds to a detector detecting the reaction between the titrant and the target analyte.

The method described herein that further comprises measuring the titration endpoint using a stepwise titrant concentration change over the specified target analyte concentration range.

The method described herein can have the conditioning reagent treat the sample stream to improve detection of the target analyte.

The method described herein can have the detection of the target analyte be improved by improving the sensitivity of the detection method.

The method described herein can have the conditioning reagent be a pH buffer, an acid, a reaction catalyst, a chemical indicator, a sequestrant, a surfactant, a conductivity modifying salt, an ion pair reagent, a biologically based chemical, or a combination thereof.

The method described herein can have the titration endpoint be detected using a light-based, electrochemically-based, or biologically-based detector.

The titration endpoint can be signaled by a detectable change at a complete reaction of the target analyte with the titrant. The detectable change can be a spectrophotometric change, an electrochemical change, or a pH change.

The method described herein can have the conditioning reagent comprise potassium iodide, acetic acid, starch indicator, a molybdate, or a combination thereof.

The method described herein can have the flow rate of the continuously flowing and continuously refreshed sample stream be increased or decreased depending on whether the titration endpoint can be detected within the specified target analyte concentration range.

The method described herein can comprise continuously flowing the process solution through the analyzer comprising a manifold and a detector; quantifying the target analyte concentration by changing the flow rate and thereby the concentration of a titrant over a specified range; and detecting a titration endpoint for the reaction between the target analyte and a titrant within a specified target analyte concentration range.

The varieties of reagents that can be the conditioning reagent are well known to a person of ordinary skill in the art and can be applied to a wide variety of titration systems.

For the methods described herein, the target analyte can comprise hydrogen peroxide, a peroxyacetic acid, performic acid, peroxyoctanoic acid, peroxysulfonated compounds, or a combination thereof. Preferably, the target analyte comprises hydrogen peroxide, a peroxy acid, or a combination thereof.

For the methods described herein, the titrant comprises thiosulfate.

For the methods described herein, the conditioning reagent comprises potassium iodide, acetic acid, starch indicator, ammonium molybdate, or a combination thereof.

In each method described herein, the actual target analyte concentration can be directly detected or the actual target analyte concentration can be calculated from the detection of the concentration of a product of the reaction of the target analyte and the titrant.

The process is such that it can be implemented anywhere, such as at a sampling point in a processing facility or other industrial or commercial location not conducive to regularly performing standard titrations.

Additionally, the entire process can be completed in a short time; approximately 2 minutes and 40 seconds. Prior to rinsing and preparing the system to take another measurement, amount can be determined in less time; approximately 1 minute and 20 seconds.

The methods described herein can further include a calibration step. Calibration steps can be performed in-line, calibrating flow rates, measurements, and the like. Calibrations can be performed prior to every titration to provide increased accuracy to the measurement. A calibration can be performed after a predetermined number of measurements, or can be prompted by a user. In-line calibrations can be performed without substantially slowing down the analysis procedure. Such calibration can include injection of a sample of known concentration and confirming that the system measures the concentration accurately. To the extent the measurement is inaccurate, the system could self-adjust in order to accurately measure the sample of known concentration.

"Amount," as used herein, refers to a generic measureable quantity such as mass, concentration, volume, etc.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the methods without departing from the scope of the invention, it is intended that all matter contained in the above description and shown in the accompanying drawings shall be interpreted as illustrative and not in a limiting sense.

What is claimed is:

1. A method for controlling a chemical process comprising
controlling a process controller communicatively coupled to a chemical reagent pump injecting a chemical reagent into the chemical process through a chemical reagent injection pump;
controlling a sample controller communicatively coupled to a sample pump, a titrant pump, and a detector,
the controller initiating a series of titration processes repeated one after the other with a set time interval between titration processes,
each titration process comprising:
collecting a sample from the chemical process;
controlling the sample pump to set the flow rate of the sample continuously flowing through a reaction manifold,
controlling the titrant pump for pumping the titrant into the reaction manifold to contact the continuously flowing sample stream and successively altering a titrant concentration in the reaction manifold and receiving a response from the detector for each different titrant concentration, and
identifying a titration endpoint for the reaction between the analyte and the titrant and determining an analyte concentration in the sample stream;
analyzing sample variation by determining the difference between a current analyte concentration and an immediately previous analyte concentration from an immediately previous titration process, and comparing the difference between the current analyte concentration and the immediately previous analyte concentration from the immediately previous titration to a specified minimum analyte concentration variation range,
when the difference between the current analyte concentration and the analyte concentration from the immediately previous titration is greater than the specified minimum analyte concentration variation range, the controller reduces the set time interval between succeeding titration processes; and
after the set time interval between succeeding titration processes is reduced, when the difference between the current analyte concentration and the analyte concentration from the immediately previous titration is less than or equal to the specified minimum analyte concentration variation range, the controller increases the set time interval between succeeding titration processes.

2. The method of claim 1, further comprising storing the specified minimum analyte concentration variation range and the analyte concentration from two or more of the series of titration processes in a memory device.

3. The method of claim 2, further comprising controlling the process controller communicatively coupled to the memory device and the chemical reagent injection pump.

4. The method of claim 3, wherein when the difference between the current analyte concentration and the analyte concentration from the immediately previous titration is greater than the specified minimum analyte concentration variation range, then the process controller increases or decreases an injection rate of the chemical reagent injection pump.

5. The method of claim 4, wherein when the difference between the current analyte concentration and the analyte concentration from the immediately previous titration is greater than the specified minimum analyte concentration variation range and the current analyte concentration is greater than the analyte concentration from the immediately previous titration, the injection rate of the chemical reagent injection pump is decreased.

6. The method of claim 4, wherein when the difference between the current analyte concentration and the analyte concentration from the immediately previous titration is greater than the specified minimum analyte concentration variation range and the current analyte concentration is less than the analyte concentration from the immediately previous titration, the injection rate of the chemical reagent injection pump is increased.

7. The method of claim 3, wherein when the difference between the current analyte concentration and the analyte concentration from the immediately previous titration is not greater than the specified minimum analyte concentration variation range, then the process controller does not change an injection rate of the chemical reagent injection pump.

8. The method of claim 1, wherein the titrant concentration is altered by changing the flow rate of the titrant.

9. The method of claim 8, wherein the set time interval between titration processes is from about 10 seconds to about 2 hours.

10. The method of claim 8, wherein the set time interval between titration processes is from about 5 minutes to about 1 hour.

11. The method of claim 8, wherein when the set time interval is reduced, the set time interval between succeeding titration processes is reduced by a factor of from about 1.5 to about 10.

12. The method of claim 8, wherein when the set time interval is reduced, the set time interval between succeeding titration processes is reduced by a factor of from about 1.5 to about 4.

13. The method of claim 1, wherein the specified minimum analyte concentration variation range is ±2.5% to about ±25% based on the measured analyte concentration.

14. The method of claim 1, wherein the specified minimum analyte concentration variation range is from about 1 ppm to about 4000 ppm.

15. The method of claim 1, wherein when the set time interval is increased, the set time interval between succeeding titration processes is increased by a factor from about 1.5 to about 10.

16. The method of claim 1, wherein when the set time interval is increased, the set time interval between succeeding titration processes is increased over one or more succeeding titrations to an original value.

17. The method of claim 1, wherein the chemical process is a hydraulic fracturing process, a meat processing process, or a vegetable processing process.

18. The method of claim 17, wherein the chemical reagent is a biocide, an acid, a base, a hardness reagent, or a detergent.

19. A method of controlling an automated titration system comprising
   controlling a controller communicatively coupled to a sample pump, a titrant pump, and a detector,
   the controller initiating a series of titration processes repeated one after the other with a set time interval between titration processes,
   each titration process comprising:
   controlling the sample pump to set the flow rate for continuous flow of a sample stream through a reaction manifold,
   controlling the titrant pump for pumping the titrant into the reaction manifold to contact the continuously flowing sample stream and successively altering a titrant concentration in the reaction manifold and receiving a response from the detector for each different titrant concentration, and
   identifying a titration endpoint for the reaction between the analyte and the titrant and determining an analyte concentration in the sample stream;
   analyzing sample variation by determining the difference between a current analyte concentration and an immediately previous analyte concentration from an immediately previous titration process, and comparing the difference between the current analyte concentration and the immediately previous analyte concentration from the immediately previous titration to a specified minimum analyte concentration variation range,
   when the difference between the current analyte concentration and the analyte concentration from the immediately previous titration is greater than the specified minimum analyte concentration variation range, the controller reduces the set time interval between titration processes; and
   after the set time interval between succeeding titration processes is reduced, when the difference between the current analyte concentration and the analyte concentration from the immediately previous titration is less than or equal to the specified minimum analyte concentration variation range, the controller increases the set time interval between succeeding titration processes.

* * * * *